United States Patent [19]

Luft

[11] 4,227,598
[45] Oct. 14, 1980

[54] TRANSMISSION DISCONNECT WITH PARKING BRAKE APPLICATION

[75] Inventor: Robert G. Luft, Wildwood, Ill.

[73] Assignee: International Harvester Company, Chicago, Ill.

[21] Appl. No.: 933,259

[22] Filed: Aug. 11, 1978

[51] Int. Cl.² ............................................. F16H 57/10
[52] U.S. Cl. ............................................. 192/4 A
[58] Field of Search ............... 192/4 A, 4 C, 13 R, 192/4 R

[56] References Cited

U.S. PATENT DOCUMENTS

| | | | |
|---|---|---|---|
| 3,565,220 | 2/1971 | Lammers | 192/13 R |
| 3,589,484 | 6/1971 | Lammers | 192/13 R |
| 3,635,317 | 1/1972 | Crabb | 192/4 A |
| 3,854,559 | 12/1974 | Talak et al. | 192/4 A |
| 3,978,946 | 9/1976 | Ream | 192/4 A |
| 4,063,624 | 12/1977 | Beck et al. | 192/4 A |

Primary Examiner—George H. Krizmanich
Attorney, Agent, or Firm—Ronald C. Kamp; F. David AuBuchon

[57] ABSTRACT

A transmission disconnect control capable of placing a transmission in a neutral condition in response to application either of a pressure-applied service brake system or of a spring-apply parking brake system including a pilot operated disconnect valve which receives a pilot signal from either a parking brake signal valve or from the service brake valve, with a shuttle valve movable to select a signal from either the service brake valve or the parking brake signal valve.

1 Claim, 1 Drawing Figure

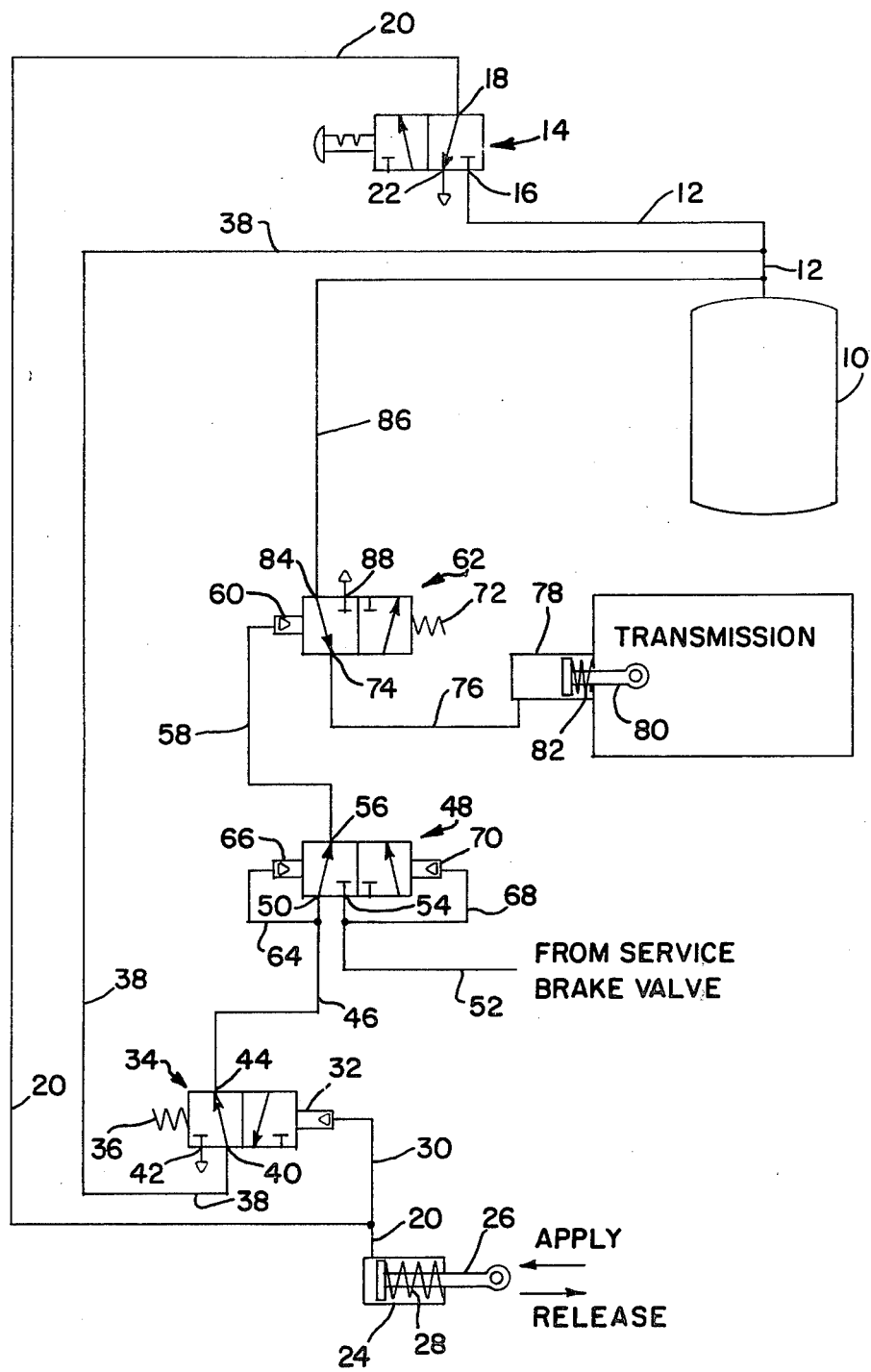

TRANSMISSION DISCONNECT WITH PARKING BRAKE APPLICATION

BACKGROUND AND SUMMARY OF THE INVENTION

This invention relates to a transmission disconnect arrangement generally and more particularly to a disconnect arrangement which will place the transmission of a vehicle in a neutral condition in response to application of the service brakes or the application of a spring-apply, pressure-release parking brake system.

It is known in the prior art to provide means to disconnect the transmission, that is to effectively place the transmission in neutral, in response to application of the service brakes. Normally on certain types of vehicles, such as rubber tired loaders, it has been found desirable to provide two brake pedals, one of which engages the service brakes while maintaining the transmission in whatever condition the operator has placed it, and the other pedal applies the service brakes while simultaneously disconnecting the transmission. The latter situation not only introduces braking to the vehicle but interrupts any drive from the engine to the wheels. Such a system is shown in U.S. Pat. No. 4,088,208 issued to Frederick R. Goode on May 9, 1978.

It is also desirable to disconnect the transmission from the parking brake if such a vehicle is engaged. That is to prevent the operator from inadvertently damaging the parking brake by attempting to drive the vehicle with the parking brake engaged. This arrangement has also been provided in the prior art. However, such arrangements have been with a parking brake which is not of the fail-safe type. A fail-safe type parking brake, one that is applied whenever the air pressure is lost, such as through a broken hose or a malfunction in some component of the air system in the vehicle, is highly desirable. However, because it is of the fail-safe type, it lacks the signal pressure normally available on the conventional type of parking brake needed to actuate the transmission disconnect.

It is therefore an object of the present invention to provide a fail-safe type parking brake system which is capable of actuating the transmission disconnect when the parking brake is applied.

It is also an object of this invention to provide a transmission disconnect which is actuated by a signal emanating from either the service brakes or from the release of a spring-apply parking brake.

These and other objects of the present invention and many of the attendant advantages will be more apparent from a perusal of the following specification and the accompanying drawings wherein the sole FIGURE is a schematic diagram of a preferred embodiment of the present invention.

DESCRIPTION OF A PREFERRED EMBODIMENT

Referring now to the drawing, there is shown an air tank 10, which may comprise in actual practice a plurality of tanks, such as a wet tank and a primary tank. Air under pressure may be supplied to the air tank 10 by conventional means, such as a compressor driven by the engine on the vehicle with which the system shown is associated. The conduit 12 communicates from the tank 10 to a parking brake control valve 14, which is a two-position, three-port valve with the conduit 12 connecting with port 16. The port 18 connects with conduit 20 and the port 22 exhausts to atmosphere. The conduit 20 connects with the parking brake cylinder 24, which has a piston rod 26 connected with the parking brake mechanism, not shown. This mechanism is arranged such that the parking brake is released when the rod 26 is extended to the right, as viewed in the drawing, as is applied when the rod is contracted to the left. A spring 28 trapped within the cylinder urges the rod toward its contracted position. When the parking brake control valve is in its "apply" position, as shown in the drawing. The conduit 12 is blocked and conduit 20 is connected with the exhaust port 20 to permit pressure in the conduit 20 to be exhausted to atmosphere, thereby permitting the spring 28 to contract the piston rod 26 to apply the parking brake. When the parking brake control valve 14 is moved to the right to its release position, conduit 12 is in communication with conduit 20 directing pneumatic pressure to the parking brake cylinder 24 to cause the piston rod 26 to be extended, against the bias of compression spring 28, to release the parking brake.

The conduit 30 connects with the conduit 20 and communicates with the pilot pressure actuator 32 of a parking brake signal valve 34. The presence of pneumatic pressure acting on actuator 32 shifts the valve 34 to the left as viewed in the drawing, while releasing of pressure from the actuator 32 permits the spring 36 to shift the valve 34 to the position shown in the drawing. The conduit 38 leads from the conduit 12 to a port 40 on the valve 34, which is a two-position three-port valve. A second port 42 exhausts to atmosphere while another port 44 connects with conduit 46 which leads to shuttle valve 48, which latter valve is a pilot-operated, double check valve. When pneumatic pressure appears in conduit 30 to cause actuator 32 to force the valve 34 to the left against the bias of spring 36, the conduit 46 connects with port 42 exhausting to atmosphere while the conduit 38 is blocked at port 40. When pressure is exhausted from conduit 30 by movement of valve 14 to its "apply" position, the force of spring 36 shifts the valve 34 to the position shown connecting conduit 38 with conduit 46 while blocking port 42.

The shuttle valve 48 is also a two-position, three-port valve which is pilot operated in each direction. The conduit 46 connects with a port 50 while a line 52 leading from the service brake system connects with port 54. A port 56 connects with conduit 58 which leads to actuator 60 of the transmission disconnect valve 62. Pilot line 64 leads from conduit 46 to actuator 66 on the valve 48. A similar pilot line 68 connects between conduit 52 and actuator 70 on the other end of valve 48. The shuttle valve 48 is thus shifted left or right in response to the presence of pressure in lines 52 and 46 respectively. Thus, the presence of high pressure in conduit 52 will shift valve 48 to the left, wherein conduit 52 is connected with conduit 58 while port 50 and conduit 46 are blocked. The presence of high pressure in conduit 46 will be communicated through conduit 64 to actuator 66 thereby causing the valve 48 to be shifted to the right, to the position shown in the drawing, wherein conduit 46 will be connected with conduit 58 and port 54 and conduit 52 will be blocked. Thus, the presence of pressure in either conduit 52 or 46 will be communicated to conduit 58 and cause actuator 60 to shift transmission disconnect valve 62 to the right against the bias of spring 72. The valve 48 also serves to isolate the service brake air system from the parking brake air system.

The transmission disconnect valve 62 is also a two-position, three-port valve with port 74 connected with conduit 76 leading to the transmission disconnect cylinder 78. The transmission disconnect cylinder has a rod 80 which is operatively connected to the transmission control means, not shown, to effect disabling or disconnecting of the transmission whenever the piston rod is extended while permitting the transmission to be operated normally when the spring 82 trapped within the cylinder 78 urges the piston and the rod 80 to a retracted position. Port 84 connects with conduit 86 which communicates with conduit 12, while port 88 exhausts to atmosphere. In the absence of pressure in conduit 58, wherein the valve 62 is moved to the left by the force of spring 72, conduit 76 is connected with port 88, which exhausts all pressure from conduit 76 permitting the spring 82 to retract the rod 80, and post 84 is blocked. The presence of pneumatic pressure in conduit 58 causes the actuator 60 to shift the valve 62 to the right, to the position shown in the drawing, thereby connecting conduit 86 with conduit 76 while simultaneously blocking port 88. In this position, air pressure from the tank 10 is communicated through the conduits 86 and 76 to the transmission disconnect cylinder 78 to extend the rod 80 and thereby disconnect the transmission.

For the foregoing description, it will be readily apparent that the present invention permits an operator to automatically disconnect the transmission upon actuation of the service brake valve or upon application of a spring-apply, pressure-release parking brake. It will also be appreciated that the shuttle valve 48 serves to isolate the service brake air system from the parking brake air system, so that actuation of either will not affect the operation of the other system. It will also be appreciated that a parking brake applied by an operator will not be inadvertently forgotten, because the operator will be unable to operate the machine with the parking brake applied, the invention automatically disconnecting the transmission to preclude such operation should the operator forget to release the spring-apply, pressure-release parking brake.

While a preferred embodiment of the present invention has been disclosed and described herein, it will be apparent to those of skill in the art that various modifications and changes may be made therein without departing from the spirit of the invention as defined by the scope of the accompanying claims.

I claim:

1. A completely pneumatic control means for coordinated actuation of air-actuated service brake and parking brake systems with a transmission disconnect on a vehicle having a transmission and a spring-apply, pressure-release parking brake; comprising:

a source of air pressure;

a parking brake cylinder normally biased to apply said parking brake and connected to release said parking brake upon receiving air pressure;

a parking brake valve interposed between said source and said parking brake cylinder and moveable between a release position in which pressure from said source is directed to said parking brake cylinder and an apply position in which said parking brake cylinder is exhausted to atmosphere;

a pneumatic transmission disconnect cylinder having a rod connected to the transmission and first bias means urging said rod toward a position in which said transmission is operative and upon receiving air pressure moves said rod to neutralize said transmission;

a transmission disconnect valve moveable between a disconnect position in which air pressure is directed from said source to said disconnect cylinder and a connect position in which said disconnect cylinder is exhausted to atmosphere;

second bias means normally urging said disconnect valve to its connect position;

first pneumatic actuator means on said transmission disconnect valve for movement of said disconnect valve to its disconnect position in response to said first actuator means receiving air pressure;

a shuttle valve having second and third pneumatic actuator means;

a first conduit connecting said shuttle valve to said first actuator means;

a parking brake signal valve having a fourth actuator means and a third bias means, said third bias means normally biasing said signal valve to a first position in which air pressure from said source is directed to said shuttle valve and said second actuator means to shift said shuttle valve to direct air pressure through said first conduit to said first actuator means, and when said parking brake valve is moved to its release position said fourth actuator means receiving air pressure from said source to shift said signal valve to exhaust said second actuator means to atmosphere; and second conduit means connecting said service brake system to said shuttle valve and said third actuator, air pressure in said second conduit means shifting said shuttle valve means to direct air pressure through said first conduit to said first actuator means to cause said disconnect valve to direct air pressure from said source to said disconnect cylinder.

* * * * *